Figure 1:
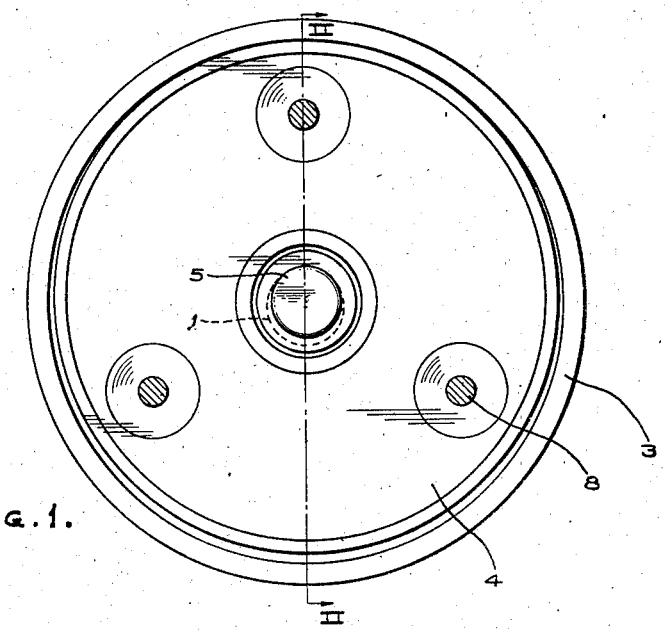

Aug. 18, 1942.   H. SCHIRRMEISTER   2,293,407
REDUCTION GEAR
Filed Oct. 25, 1940

WITNESSES:
R. J. Eisinger
E. H. Lutz

INVENTOR
HANS SCHIRRMEISTER
BY
ATTORNEY

Patented Aug. 18, 1942

2,293,407

UNITED STATES PATENT OFFICE 2,293,407

REDUCTION GEAR

Hans Schirrmeister, Berlin-Siemensstadt, Germany, assignor to Westinghouse Electric & Manufacturing Company, East Pittsburgh, Pa., a corporation of Pennsylvania Application October 25, 1940, Serial No. 362,817
In Germany August 28, 1939

2 Claims. (Cl. 74—302)

This invention relates to a reduction gear which is particularly suitable for driving low-speed domestic machines and the like. Such domestic machines are operated at a speed of about 50 to 200 R. P. M. If in such machines a high-speed universal motor is to be employed the gear must have a transmission ratio of about 1:100 to 1:300. To this end, as a rule, double reduction gears had hitherto to be employed which are relatively expensive and easily produce an objectionable noise. It has already been proposed to use for this purpose differential gears; such gears are, however, very expensive, since the costs of the manufacture of gear wheels necessary therefor are very high. As hereinafter described a reduction gear is disclosed which reduces in one step in a practically noiseless manner the high speed of the driving motor to the speed of the machine to be driven and which is besides economical to manufacture and simple to assemble.

According to the invention the reduction gear is designed as a hypocycloid gear in such a manner that a wheel designed preferably as a friction wheel is rotatably mounted on an eccentric of the high-speed driving shaft and rolls on the inner wall of a cylindric casing arranged coaxially with respect to the driving shaft and is resiliently secured at one or more points to the shaft to be driven, for instance, by means of driving pins consisting of rubber or the like or mounted in rubber inserts. A point of the rolling wheel then moves along a hypocycloid curve which runs coaxially with respect to the axis of the driving shaft. This point advances in the direction of rotation upon each rotation of the driving shaft to such an extent as to correspond to the difference between the inner diameter of the cylindric casing and the outer diameter of the friction wheel. Since this difference is relatively very small a high reduction ratio may be thus attained.

In order to obtain in such a device the frictional pressure necessary between the friction wheel and the cylindric outer casing and to avoid as far as possible the production of noises, at least one of the two frictional surfaces is provided with a covering of resilient material, particularly of rubber. In some cases it may also be preferable to provide only the inner wall of the cylindric outer casing with an elastic lining. Furthermore, the friction wheel is preferably so coupled with the shaft to be driven that the friction wheel may be radially displaced with respect to the driven shaft, but its circular movement is transmitted to the driven shaft. By resiliently securing the friction wheel to the driven shaft a proper transmission of the torque exerted by the friction wheel is attained. Moreover, the further advantage is presented in that the gear may also operate, even if the driving shaft and driven shaft do not lie in an axis but under an angle with respect to each other.

In the accompanying drawing is shown an embodiment of the reduction gear designed according to the invention.

Figure 2:
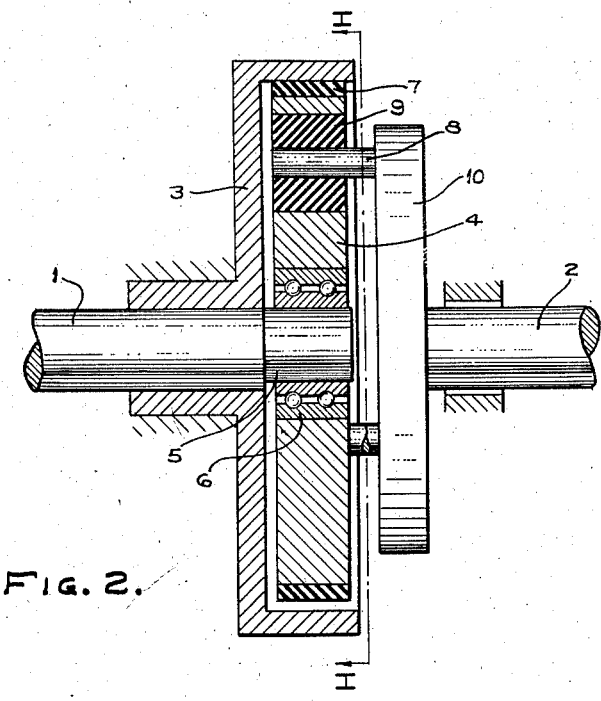

Referring to Figs. 1 and 2, 1 is the driving shaft and 2 the driven shaft of the reduction gear. It will be noted from the drawing that these two shafts are substantially coaxial. The driving shaft is journaled in a cup-shaped stationary casing 3 on whose cylindric inner wall rolls, in this case, a friction wheel 4 mounted on an eccentric 5 of the driving shaft 1 with the aid of the ball bearing 6 and provided on the outer periphery with a covering 7 of rubber. The friction wheel 4 is secured to the disk 10 mounted on the driven shaft 2 by means of three driving pins 8 mounted in the elastic rubber inserts 9 of the wheel 4. Each insert 9 describes during the rolling of the friction wheel 4 on the cylindric inner surface of the casing 3 a circularly closed hypocycloid curve. This very slow circular movement of the insert 9 is transmitted to the disk 10 so that the disk 10 and the driven shaft 2 as well are caused to rotate at a low speed. The radial oscillations of the friction wheel 4 corresponding to the hypocycloid curve do not disturb the transmission of the circular movement, since each driving pin 8 is resiliently mounted in the wheel 4. If the difference between the friction wheel and the cylindric inner wall of the casing 3 is chosen correspondingly small the desired great transmission ratio may thus be easily attained.

What is claimed is:

1. In a speed-reducing mechanism, the combination of a stationary member having a circular inwardly-facing surface, a driving shaft concentric with said surface, an eccentric rotatable by said driving shaft, a friction wheel mounted on said eccentric and adapted to roll against the inwardly-facing surface of said member as said driving shaft rotates, a plurality of resilient rubber inserts mounted in said friction wheel, a driven shaft substantially coaxial with said driving shaft and a plurality of pins attached to said driven shaft and extending substantially parallel to its axis, one end of each of said pins extending into one of said rubber inserts which forms a driving connection between the friction wheel and the pin, the connections between said eccentric and said friction wheel, between said friction wheel and said inwardly-facing surface and between said friction wheel and said pins being disposed substantially in a common plane.

2. In a speed reducing mechanism, the combination of a stationary cup-shaped casing, a driving shaft journaled in said casing, an eccentric rotatable by said shaft, a friction wheel mounted on said eccentric and adapted to roll against the inner surface of said cup-shaped casing as said driving shaft rotates, a plurality of resilient rubber inserts mounted in said friction wheel, said inserts being centrally located on a circle concentric with said friction wheel and spaced equal distances apart about the circumference of said circle, a driven shaft substantially coaxial with said driving shaft, a disc mounted on said driven shaft and rotatable therewith, a pin extending between each of said rubber inserts and said disc, each of said pins having one of its ends connected to one of said rubber inserts and its other end connected to said disc, said pins thereby providing a positive driving connection between said friction wheel and said driven shaft.

HANS SCHIRRMEISTER.